(12) United States Patent
Bray et al.

(10) Patent No.: US 9,150,310 B1
(45) Date of Patent: Oct. 6, 2015

(54) METHODS AND SYSTEMS FOR DIRECTING REMOTE AERIAL REFUELING OPERATIONS

(75) Inventors: James F. Bray, Des Peres, MO (US); Kenneth A. Cobleigh, Kent, WA (US)

(73) Assignee: The Boeing Company, Chicago, IL (US)

( * ) Notice: Subject to any disclaimer, the term of this patent is extended or adjusted under 35 U.S.C. 154(b) by 546 days.

(21) Appl. No.: 12/879,646

(22) Filed: Sep. 10, 2010

(51) Int. Cl.
*B64D 39/00* (2006.01)

(52) U.S. Cl.
CPC ..................... *B64D 39/00* (2013.01)

(58) Field of Classification Search
USPC ..................................................... 244/135 A
See application file for complete search history.

(56) References Cited

U.S. PATENT DOCUMENTS

| | | | | |
|---|---|---|---|---|
| 5,188,313 A * | 2/1993 | Piasecki | ............................. | 244/3 |
| 5,499,784 A * | 3/1996 | Crabere et al. | ............. | 244/135 A |
| 5,904,729 A * | 5/1999 | Ruzicka | ......................... | 701/300 |
| 7,148,861 B2 * | 12/2006 | Yelton et al. | ....................... | 345/8 |
| 7,219,857 B2 * | 5/2007 | Takacs et al. | .............. | 244/135 A |
| 7,309,048 B2 * | 12/2007 | von Thal et al. | .......... | 244/135 A |
| 7,458,543 B2 * | 12/2008 | Cutler et al. | .............. | 244/135 A |
| 7,619,626 B2 * | 11/2009 | Bernier | ......................... | 345/427 |
| 7,665,479 B2 * | 2/2010 | Cutler et al. | ....................... | 137/1 |
| 7,887,010 B2 * | 2/2011 | Takacs et al. | .............. | 244/135 A |
| 7,980,512 B1 * | 7/2011 | Speer et al. | ................ | 244/135 A |
| 8,332,081 B2 * | 12/2012 | vila Aparicio et al. | ........... | 701/3 |
| 2007/0205328 A1 | 9/2007 | Iverson, Jr. et al. | | |

\* cited by examiner

*Primary Examiner* — Brian M O'Hara
*Assistant Examiner* — Keith L Dixon
(74) *Attorney, Agent, or Firm* — Armstrong Teasdale LLP

(57) ABSTRACT

A method for aerial refueling situational awareness is described. The method includes providing, to a display, a video image of the refueling environment, and providing at least one video overlay onto the video image, the at least one video overlay indicative of a positional relationship between an aircraft to be refueled and a tanker aircraft, the at least one video overlay including at least one guidance cue to assist in the alignment and coupling of the aerial refueling boom with the receiving aircraft receptacle.

21 Claims, 15 Drawing Sheets

METHODS AND SYSTEMS FOR DIRECTING REMOTE AERIAL REFUELING OPERATIONS

BACKGROUND

The field of the disclosure relates generally to aerial refueling, and more specifically, to methods and systems for directing remote aerial refueling operations.

As newer aerial refueling tankers are fielded, the boom operator is being moved from looking out a window in the tail of the aircraft to a highly sophisticated remote workstation near the flight deck. This move requires a high-fidelity enhanced vision system to be provided to the boom operator to enable them to visually acquire the aerial refueling environment, so that they may manually "fly" the aerial refueling boom into the receiver aircraft's refueling receptacle. This remote workstation is sometimes referred to as the Aerial Refueling Operator Station (AROS).

Both the AROS and the older systems in which the boom operator is in the tail of the aircraft utilize manual (human initiated) acquisition and identification of the receiving aircraft. Generally, acquisition is made via handoff from the pilot(s) to the boom operator via intercom during rendezvous between the tanker and receiving aircraft. As such, positive target (receiving aircraft) identification is determined through visual means by the Aerial Refueling Operator (ARO).

In systems that employ an AROS and an enhanced vision system, a 3-D Boom Aerial Refueling Camera System (BARCS) is utilized along with a wider field of view 2-D camera set called the Situational Awareness Camera Systems (SACS). In operation, the boom operator utilizes the SACS for peripheral situational awareness and the BARCS to make contact with the receiver aircraft using the flying boom.

The SACS gives the boom operator a wingtip to wingtip view behind the aircraft so they can keep track of the various receiving aircraft maneuvering behind the refueling aircraft, for example, formations of fighter aircraft that flow across the boom area to refuel. In such a scenario, the boom operator manually "flies" the boom with no on-screen visual cues, just the view through the camera systems. In a sense, the operator is "flying" the refueling boom via remote control, with no direct view to determine how the boom is aligned in space.

As can be easily understood, the currently utilized boom operation methodology involves many steps to be accomplished manually by the boom operator, with little or no automation to aid in this critical and sensitive operation. Another limitation is that the currently implemented boom operation methodology requires a qualified full time boom operator, adding expense to the mission and putting another aircrew member at risk. In addition, current systems do not do employ automated positive target identification which can result in having to manually establish communication between the tanker and the receiving aircraft. Manual identification can be distracting for the crew and can defocus the refueling effort, which is an inherently dangerous operation and requires the utmost of concentration to accomplish. Further, in certain emission controlled (EMCON) situations, radio communications with the receiver are not possible, thus making positive receiver identification more difficult.

There is no capability to give target identification and other visual aim point cues to the boom operator to accurately position the boom relative to the receiver aircraft as the mission unfolds. Rather, boom positioning is done manually and remotely via basic video camera systems. Further, there are no visual cues identifying the location and hazards surrounding the refueling receptacle, such as a Universal Aerial Refueling Receptacle Slipway Installation (UARRSI), on the receiving aircraft. Therefore minimal information is provided to take measures, such as micro maneuvering, to ensure successful and complete refueling operations. As can be easily understood, the lack of cues and manually intensive effort extended by boom operators can result in significant operator stress and fatigue.

BRIEF DESCRIPTION

In one aspect, a method for aerial refueling situational awareness is provided. The method includes providing, to a display, a video image of the refueling environment, and providing at least one video overlay onto the video image, the at least one video overlay indicative of a positional relationship between an aircraft to be refueled and a tanker aircraft, the at least one video overlay including at least one guidance cue to assist in the alignment and coupling of the aerial refueling boom with the receiving aircraft receptacle.

In another aspect, an aerial refueling situational awareness system is provided. The system includes a camera operable to provide a video image of a refueling area, the refueling area including a distal end of a refueling boom therein, a video processing system communicatively coupled to the camera, and an operator display communicatively coupled to the video processing system for viewing images of the refueling environment. The video processing system is programmed to generate at least one overlay onto the video image, the at least one video overlay configured to provide situational awareness to a boom operator viewing the operator display regarding the refueling area and a relationship between an aircraft to be refueled and an aircraft configured with the system.

The features, functions, and advantages that have been discussed can be achieved independently in various embodiments or may be combined in yet other embodiments further details of which can be seen with reference to the following description and drawings.

DETAILED DESCRIPTION

The embodiments described herein are related to methods and systems to enhance the aerial refueling boom guidance on a tanker aircraft eventually leading to autonomous operations including refueling UAVs.

The advent of the Aerial Refueling Operator Station (AROS) as mentioned above allows for the exploitation of new technology. In the embodiments described herein, the boom operator is provided with new tools to enable them to increase the efficiency and safety within which to perform their mission. Specifically, the described embodiments are related to a leveraging of the technologies resident in a modern AROS is to provide the boom operator with overlaid guidance on top of their visual image of the refueling environment. Such guidance projects the contact point where the boom engages the receiver aircraft and helps the boom operator fly the boom to the correct location, and then extend the boom to complete the contact with the receiver aircraft. As such, the state of the art in aerial refueling is advanced, the final goal being to enable safer more efficient boom operations that could eventually lead into a fully autonomous system that even UAVs could access.

As further described herein, the embodiments provide recognition of the receiving aircraft and its aerial refueling receptacle and provides guidance cues to the boom operator to assist in "flying" the boom so as to safely achieve contact with the receiving aircraft. Such embodiments also are useful in retrieving the boom from potentially dangerous situations that can arise when premature disconnect occurs between the boom and receiving aircraft, thus enabling an aerial refueling mission which decreases operator fatigue, improves mission success and lowers the perceived risk of this critical task.

Figure 1:
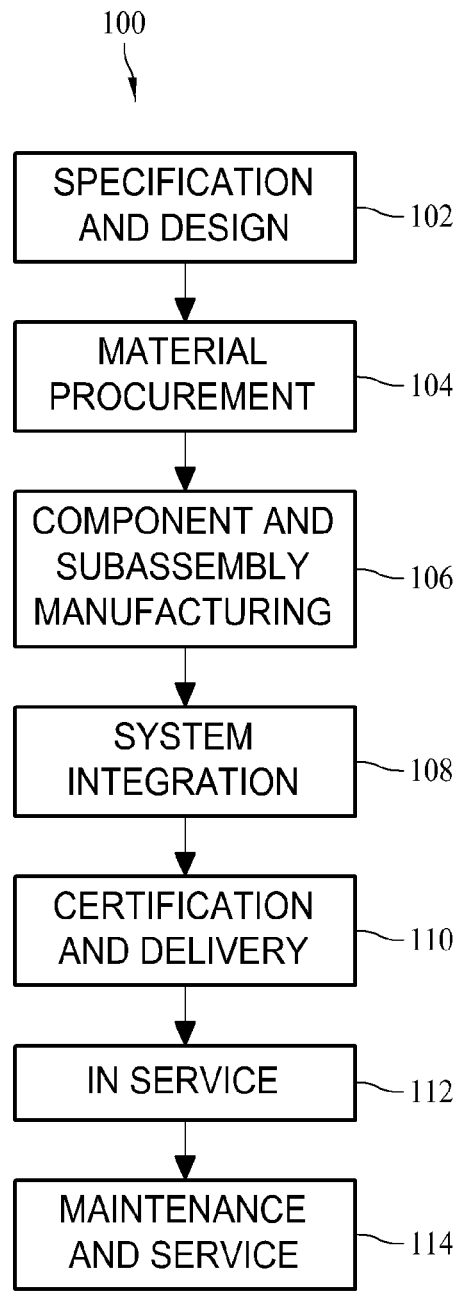
FIG. 1 is a flow diagram of an aircraft production and service methodology.
Figure 2:
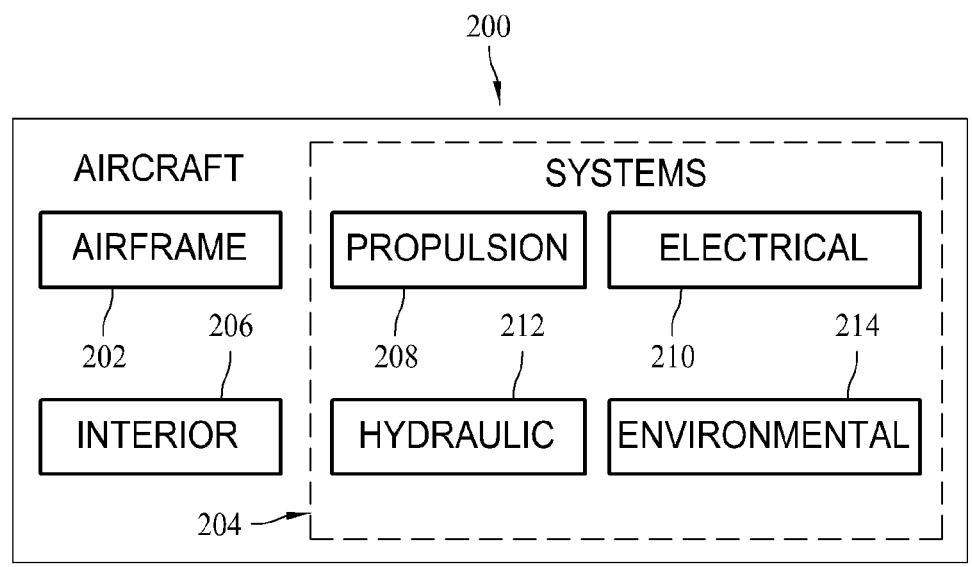
FIG. 2 is a block diagram of an aircraft.

Referring more particularly to the drawings, embodiments of the disclosure may be described in the context of aircraft manufacturing and service method 100 as shown in FIG. 1 and an aircraft 200 as shown in FIG. 2. During pre-production, aircraft manufacturing and service method 100 may include specification and design 102 of aircraft 200 and material procurement 104.

During production, component and subassembly manufacturing 106 and system integration 108 of aircraft 200 takes place. Thereafter, aircraft 200 may go through certification and delivery 110 in order to be placed in service 112. While in service by a customer, aircraft 200 is scheduled for routine maintenance and service 114 (which may also include modification, reconfiguration, refurbishment, and so on).

Each of the processes of aircraft manufacturing and service method 100 may be performed or carried out by a system integrator, a third party, and/or an operator (e.g., a customer). For the purposes of this description, a system integrator may include, without limitation, any number of aircraft manufacturers and major-system subcontractors: a third party may include, for example, without limitation, any number of venders, subcontractors, and suppliers: and an operator may be an airline, leasing company, military entity, service organization, and so on.

As shown in FIG. 2, aircraft 200 produced by aircraft manufacturing and service method 100 may include airframe 202 with a plurality of systems 204 and interior 206. Examples of systems 204 include one or more of propulsion system 208, electrical system 210, hydraulic system 212, and environmental system 214. Any number of other systems may be included in this example. Although an aerospace example is shown, the principles of the disclosure may be applied to other industries, such as the automotive industry.

Apparatus and methods embodied herein may be employed during any one or more of the stages of aircraft manufacturing and service method 100. For example, without limitation, components or subassemblies corresponding to component and subassembly manufacturing 106 may be fabricated or manufactured in a manner similar to components or subassemblies produced while aircraft 200 is in service.

Also, one or more apparatus embodiments, method embodiments, or a combination thereof may be utilized during component and subassembly manufacturing 106 and system integration 108, for example, without limitation, by substantially expediting assembly of or reducing the cost of aircraft 200. Similarly, one or more of apparatus embodiments, method embodiments, or a combination thereof may be utilized while aircraft 200 is in service, for example, without limitation, to maintenance and service 114 may be used during system integration 108 and/or maintenance and service 114 to determine whether parts may be connected and/or mated to each other.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

Figure 3:
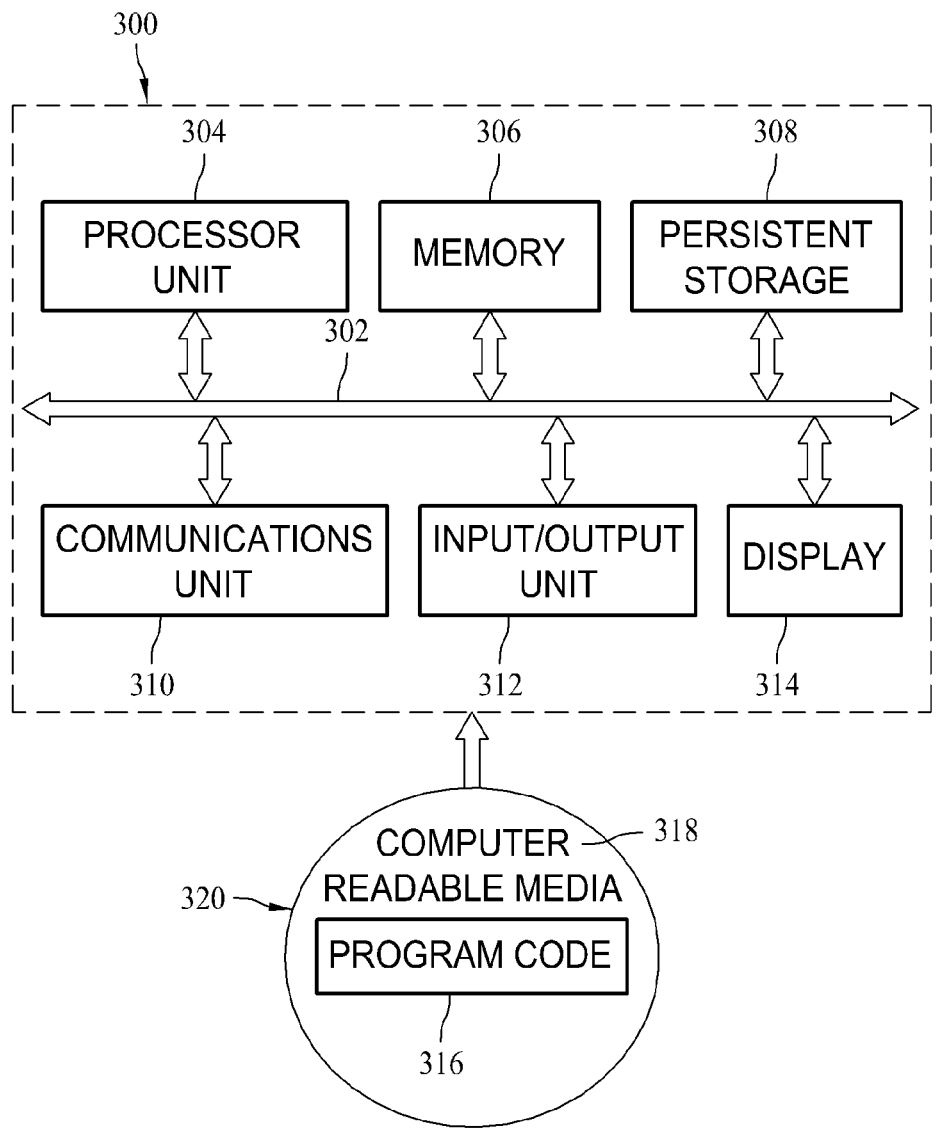
FIG. 3 is a diagram of a data processing system.

Turning now to FIG. 3, a diagram of a data processing system is depicted in accordance with an illustrative embodiment. In this illustrative example, data processing system 300 includes communications fabric 302, which provides communications between processor unit 304, memory 306, persistent storage 308, communications unit 310, input/output (I/O) unit 312, and display 314. While many embodiments of data processing systems exists, data processing system is one useful example of a system that is utilized in the overlaying of guidance queues in an aircraft refueling system.

Processor unit 304 serves to execute instructions for software that may be loaded into memory 306. Processor unit 304 may be a set of one or more processors or may be a multi-processor core, depending on the particular implementation. Further, processor unit 304 may be implemented using one or more heterogeneous processor systems in which a main processor is present with secondary processors on a single chip. As another illustrative example, processor unit 304 may be a symmetric multi-processor system containing multiple processors of the same type.

Memory 306 and persistent storage 308 are examples of storage devices. A storage device is any piece of hardware that is capable of storing information either on a temporary basis and/or a permanent basis. Memory 306, in these examples, may be, for example, without limitation, a random access memory or any other suitable volatile or non-volatile storage device. Persistent storage 308 may take various forms depending on the particular implementation. For example, without limitation, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, without limitation, a removable hard drive may be used for persistent storage 308.

Communications unit 310, in these examples, provides for communications with other data processing systems or devices. In these examples, communications unit 310 is a network interface card. Communications unit 310 may provide communications through the use of either or both physical and wireless communication links.

Input/output unit 312 allows for input and output of data with other devices that may be connected to data processing system 300. For example, without limitation, input/output unit 312 may provide a connection for user input through a keyboard and mouse. Further, input/output unit 312 may send output to a printer. Display 314 provides a mechanism to display information to a user.

Instructions for the operating system and applications or programs are located on persistent storage 308. These instructions may be loaded into memory 306 for execution by processor unit 304. The processes of the different embodiments may be performed by processor unit 304 using computer implemented instructions, which may be located in a memory, such as memory 306. These instructions are referred to as program code, computer usable program code, or computer readable program code that may be read and executed by a processor in processor unit 304. The program code in the different embodiments may be embodied on different physical or tangible computer readable media, such as memory 306 or persistent storage 308.

Program code 316 is located in a functional form on computer readable media 318 that is selectively removable and may be loaded onto or transferred to data processing system 300 for execution by processor unit 304. Program code 316 and computer readable media 318 form computer program product 320 in these examples. In one example, computer readable media 318 may be in a tangible form, such as, for example, an optical or magnetic disc that is inserted or placed into a drive or other device that is part of persistent storage 308 for transfer onto a storage device, such as a hard drive that is part of persistent storage 308. In a tangible form, computer readable media 318 also may take the form of a persistent storage, such as a hard drive, a thumb drive, or a flash memory that is connected to data processing system 300. The tangible form of computer readable media 318 is also referred to as computer recordable storage media. In some instances, computer readable media 318 may not be removable.

Alternatively, program code 316 may be transferred to data processing system 300 from computer readable media 318 through a communications link to communications unit 310 and/or through a connection to input/output unit 312. The communications link and/or the connection may be physical or wireless in the illustrative examples. The computer readable media also may take the form of non-tangible media, such as communications links or wireless transmissions containing the program code.

In some illustrative embodiments, program code 316 may be downloaded over a network to persistent storage 308 from another device or data processing system for use within data processing system 300. For instance, program code stored in a computer readable storage medium in a server data processing system may be downloaded over a network from the server to data processing system 300. The data processing system providing program code 316 may be a server computer, a client computer, or some other device capable of storing and transmitting program code 316.

The different components illustrated for data processing system 300 are not meant to provide architectural limitations to the manner in which different embodiments may be implemented. The different illustrative embodiments may be implemented in a data processing system including components in addition to or in place of those illustrated for data processing system 300. Other components shown in FIG. 3 can be varied from the illustrative examples shown.

As one example, a storage device in data processing system 300 is any hardware apparatus that may store data. Memory 306, persistent storage 308 and computer readable media 318 are examples of storage devices in a tangible form.

In another example, a bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 306 or a cache such as that found in an interface and memory controller hub that may be present in communications fabric 302.

Figure 4:
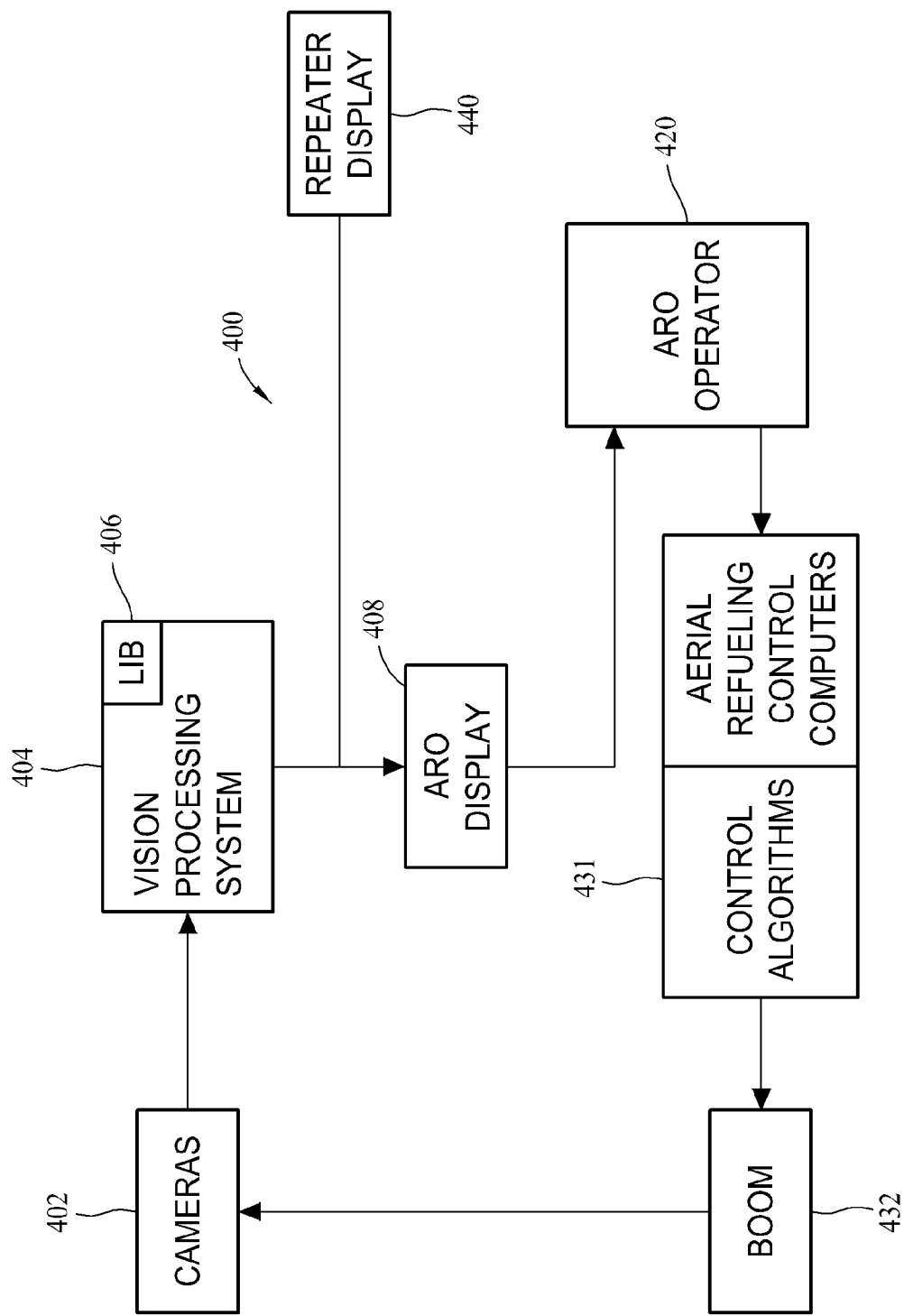
FIG. 4 is a block diagram of an aerial refueling system.

As mentioned above, the above described data processing system 300 is one example system that can be utilized in providing a boom operator with overlaid guidance on top of their visual image of the refueling environment. To further illustrate, FIG. 4 is a block diagram of an aerial refueling system 400 which may incorporate one or more data processing systems similar to system 300, shown in FIG. 3.

Aerial refueling system 400 includes a camera 402 providing signals to a vision processing system 404 which may include a library 406 of receiving aircraft images, allowing system 400 to compare aircraft sensed by camera 402 to stored images within library 406 to identify the aircraft type of an aircraft sensed by camera 402. System 400 further includes a display 408 providing aerial refueling (boom) operator 420 a visualization of the refueling environment, as sensed by camera 402. In addition to the visualization of the refueling environment, as sensed by camera 402, display 408 further includes overlays onto the depiction of the refueling environment. The overlays are based on the processing of signals within vision processing system 404.

Using boom flight controls generated within aerial refueling control computers 430 and control algorithms 431 therein, the boom operator 420, using stick commands, controls positioning and extension of the refueling boom 432 via the aerial refueling control computers 430 which outputs signals to actuators associated with the boom 432. As boom 432 is within the field of view of camera 402, boom positioning images are sensed by camera 402 and passed along to vision processing system 404. As such, vision processing system 404 is operable to generate further overlays, to be included within a visualization of the refueling environment, that are related to boom positioning, extension, and utilization as described with respect to the following figures.

At least a portion of the application running within vision processing system 404 is referred to as the Aerial Refueling Operator Station (AROS) Flight Director. As described herein, the flight director provides a leveraging of the computer processing capabilities and enhanced vision system capabilities in the aerial refueling system 400 to give the boom operator increased capabilities. This "remote vision" method of visualizing the receiver aircraft presents a three dimensional image to the boom operator, to provide the depth perception required to conduct aerial refueling contacts. In one embodiment, additional sensors are integrated into the overall tanker system, such as millimeter wave radar sensors, which are utilized to enhance the visualization provided to the user in marginal meteorological conditions.

The aerial refueling system 400 displays boom flight control cues on display 408 that are similar to those of an aircraft instrument landing system (ILS). The flight director provides receiver aircraft distance and closure rate to the boom operator and has significant advantages when operating under less than optimal visual conditions. Vision processing system 404 also mitigates any perceived risk changing from tail of the aircraft "picture window" implementation to remote vision aerial refueling (AR) implementations. The flight director portion of vision processing system 404 also provides enhanced pilot situational awareness, in one embodiment, via a repeater display 440 in the flight deck.

In embodiments, receiving aircraft location, type, distance, and closure rate is provided as well as aerial refueling boom flight direction cues which enhance aerial refueling operator (boom operator) situational awareness.

In one embodiment, the described embodiments include three elements. The first, as mentioned above, is referred to as the flight director program which resides as software within vision processing system 404 which is a part of the console utilized by the boom operator. The flight director program might be considered an executive, as other elements are essentially "called" by this program to evoke specific operations relative thereto.

Figure 5:
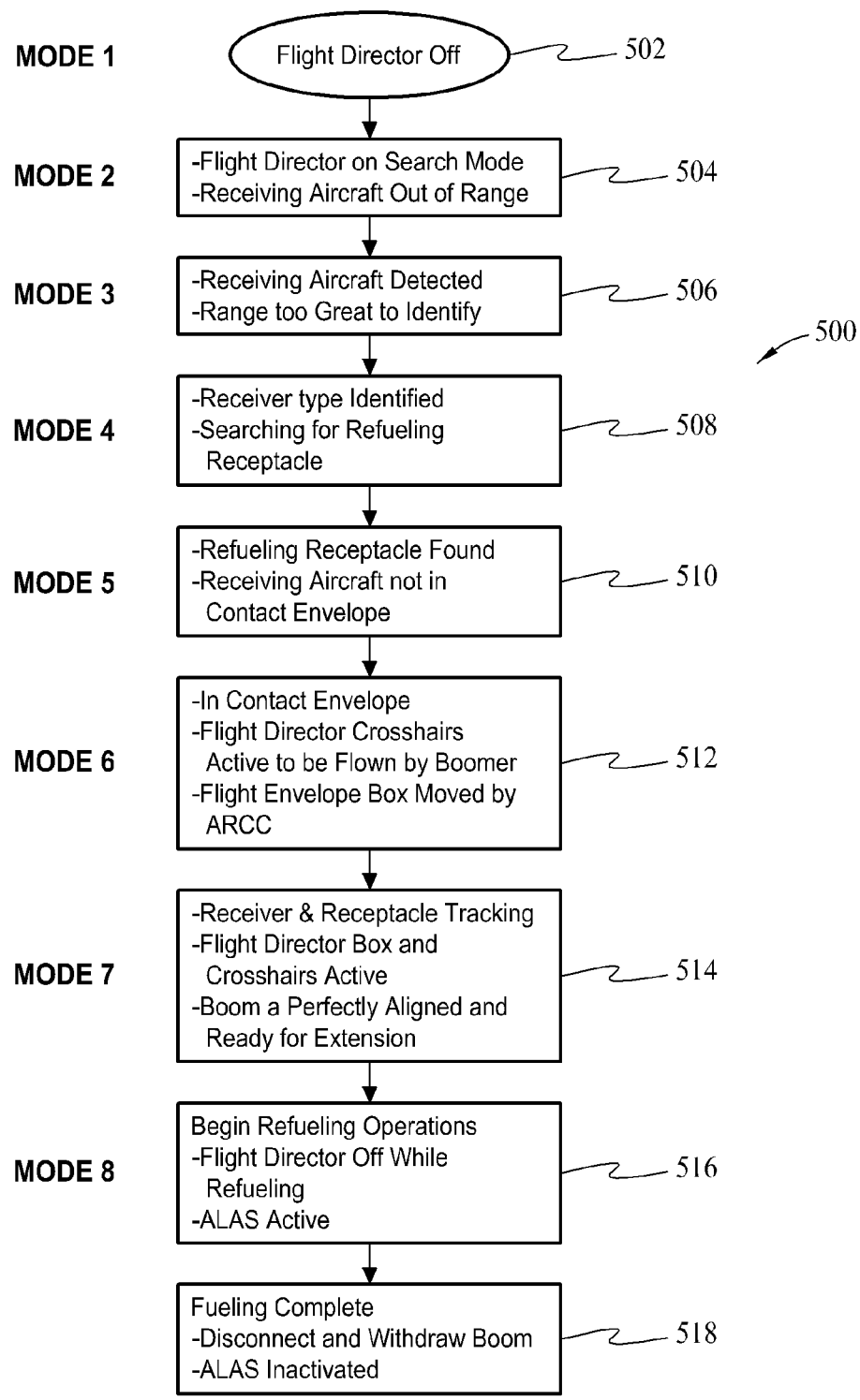
FIG. 5 is an operational system flow for a flight director program defining several operational modes.

FIG. 5 is an operational system flow 500 for the flight director program which defines several operational modes. Mode 1 502 describes the situation where the aerial refueling system 400 is in its default, or "off", mode, with no "target" (or receiving) aircraft within detectable range. During this time, no requests are in the system 400 for refueling, so the system 400 remains in its off mode. As soon as a request for fuel comes in, mode 2 504 is initiated, and the flight director program is started. Mode 2 504 is defined as a state where the flight director program is on, but the receiving aircraft is out of detectable range and is sometimes referred to as a search mode. Once the target receiving aircraft is detected, the system 400 transitions to mode 3 506, but at this time the aircraft is at a range where the automatic identification capability of aerial refueling system 400 is not operational. At mode 4 508, the target receiving aircraft has been identified by system 400 and is reported to the boom operator via the display 408. Once the target receiving aircraft is identified, the flight director program of the vision processing system 404 determines the number of pumps and the flow rate through the boom 432 utilized by that aircraft type thereby minimizing the potential for improper fueling operations and lessens the tasking of the operator.

Mode 5 510 occurs when the refueling receptacle, for example, a universal aerial refueling receptacle slipway installation (UARRSI) or other refueling receptacle, is located and tracked, yet the target receiving aircraft is in its approach mode and is not yet in the contact envelope. Transition to mode 6 512 occurs when the target receiving aircraft enters the contact envelope and, as illustrated in the following figures, flight director crosshairs appear on the display 408. In addition, an air refueling control computer (ARCC) operates to move a target box overlay shown on display 408 (where the target is the refueling receptacle). Mode 7 514 begins when the boom 432 is perfectly aligned for insertion into the refueling receptacle of the target receiving aircraft. This alignment is achieved by centering the boom 432 in the middle of the depicted crosshairs in all four positions (up/down/left/right). It is during mode 7 514 where the flight director program operates to optimize the insertion angle to minimize the probability of binding and undesirable and consequential disconnect between the boom 432 and the target receiving aircraft. Finally, at mode 8 516 the refueling operation begins and a, automatic load alleviation system (ALAS) is initiated within vision processing system 404. ALAS and its enhancements are further described below. When the fueling is complete 518, the boom 432 is disconnected and withdrawn and the ALAS is deactivated. The fueling operations are then completed, and the aerial refueling system 400 resets and stands by ready for the next receiving aircraft to begin the sequence anew. A breakaway mode, which is not part of normal refueling operations, and therefore not included in system flow 500 is described below and is sometimes referred to as mode 9.

Aerial refueling system 400 includes further enhancements available to an aerial refueling operator should a breakaway mode occur. Breakaway mode occurs when, for example, a closure rate and distance between a tanker aircraft and a target receiving aircraft is within a certain range. Procedurally, when a breakaway mode occurs, the tanker aircraft and the target receiving aircraft undertake evasive flight procedures in an attempt to avoid a collision or other potentially catastrophic event. In the event of a boom disconnect or breakaway mode, the aerial refueling system 400 responds by warning the ARO visually through display 408 and/or audibly. As described with respect to forthcoming figure descriptions, a screen outline of the tracked aircraft shown on display 408 to the ARO changes color, for example, from green to red. In an embodiment, distance and closure cues are provided on display 408 to track the breakaway progress.

In addition to the flight director element, an operator console portion is included within aerial refueling system 400. Operators console runs within vision processing system 404 to provide enhanced vision upgrades. By moving the workstation to the main deck, proximate the flight deck, and through the addition of cameras to the unpressurized hull and processing capabilities that bring the boom view to the boom operator, allows for better crew resource management (CRM). Such a configuration also enables next-generation technology to be incorporated into what has been, up until the currently described embodiments, a fully manual direct-view situation.

The third element running within vision processing system 404 is the automatic load alleviation system (ALAS). The ALAS is essentially an autoflight system which begins operation after engagement between the target receiving aircraft and the boom 432 connect and operates to keep lateral forces off the boom 432 as the target receiving aircraft maneuvers within its allowed refueling area envelope. There are multiple envelopes for the boom 432, with the smallest being the contact envelope within which contact between it and an aircraft may be attempted. A receiver aircraft's envelope is based on boom maneuvering limits and unique receiver considerations to create a unique envelope in which the receiving aircraft is allowed to fly. If the receiving aircraft flies outside of this envelope, the boom flight controls 430 will automatically disconnect the two. There is also a mechanical limit envelope for the boom 432, beyond which damage to the boom will occur.

The embodiments described herein are enhancements to this concept that are related to ALAS failure. Currently, the boom operator must hand fly the boom 432, tracking the movements of the receiving aircraft to keep side loads off the boom 432 during aerial refueling. It is easy to understand the difficulties associated with such an arrangement. If the boom disconnects from the receiving aircraft, say off to one side and in one of the lower corners of the refueling envelope, and the boom is not being flown such that it has neutral forces (flying it into the wind so it would hold still after the receiver disconnects), then the boom will instantly move due to the side forces and possibly strike the receiver aircraft. This could shatter the canopy, probably cause damage to the engine, as well as damage the boom 432. The boom operator constantly flies the boom while in contact to attempt to keep neutral forces on the boom in the event of a disconnect.

In embodiments, the ALAS is enhanced by leveraging the outputs of sensors already present to help provide the boom operator with super-imposed visual cues in the event of ALAS failure. Using strain gauges and other existing sensor input, processors, boom control architecture, and the remote vision system described herein, ALAS failures or degradations are sensed, and the boom operator is provided with sensor data to help the boom operator fly the boom in an "unloaded" condition. Flying the boom in an "unloaded" condition prevents unintended boom movement during an unplanned disconnect event, minimizes stress and damage to boom while in contact, and provides Military Flight Operations Quality Assurance (MFOQA) data to the aircraft data recording system for maintenance and other debrief purposes.

The three elements (the Flight Director program, the operators console, the ALAS system) of aerial refueling system 400 described above are an integrated part of an overall flight management system associated with aerial refueling system 400. The following description and figures provide a look, from an operator's perspective, of how the aerial refueling system 400 functions. The integrated elements realize a robust, easy to operate flight management system for airborne refueling operations. Guidance algorithms, control laws, and docking methodology within system 400 drive automation of the refueling process.

As described above, the flight director assists the boom operator in achieving "contact" between the receiver aircraft and the boom when performing boom aerial refueling. FIGS. 6-15 are example displays provided to a boom operator by on display 408 of aerial refueling system 400 and illustrate the progression of steps and one potential display arrangement for the operator's console (display 408) of the aerial refueling system 400. The slide bars at the periphery used for boom alignment are shown to provide a complete presentation.

Figure 6:
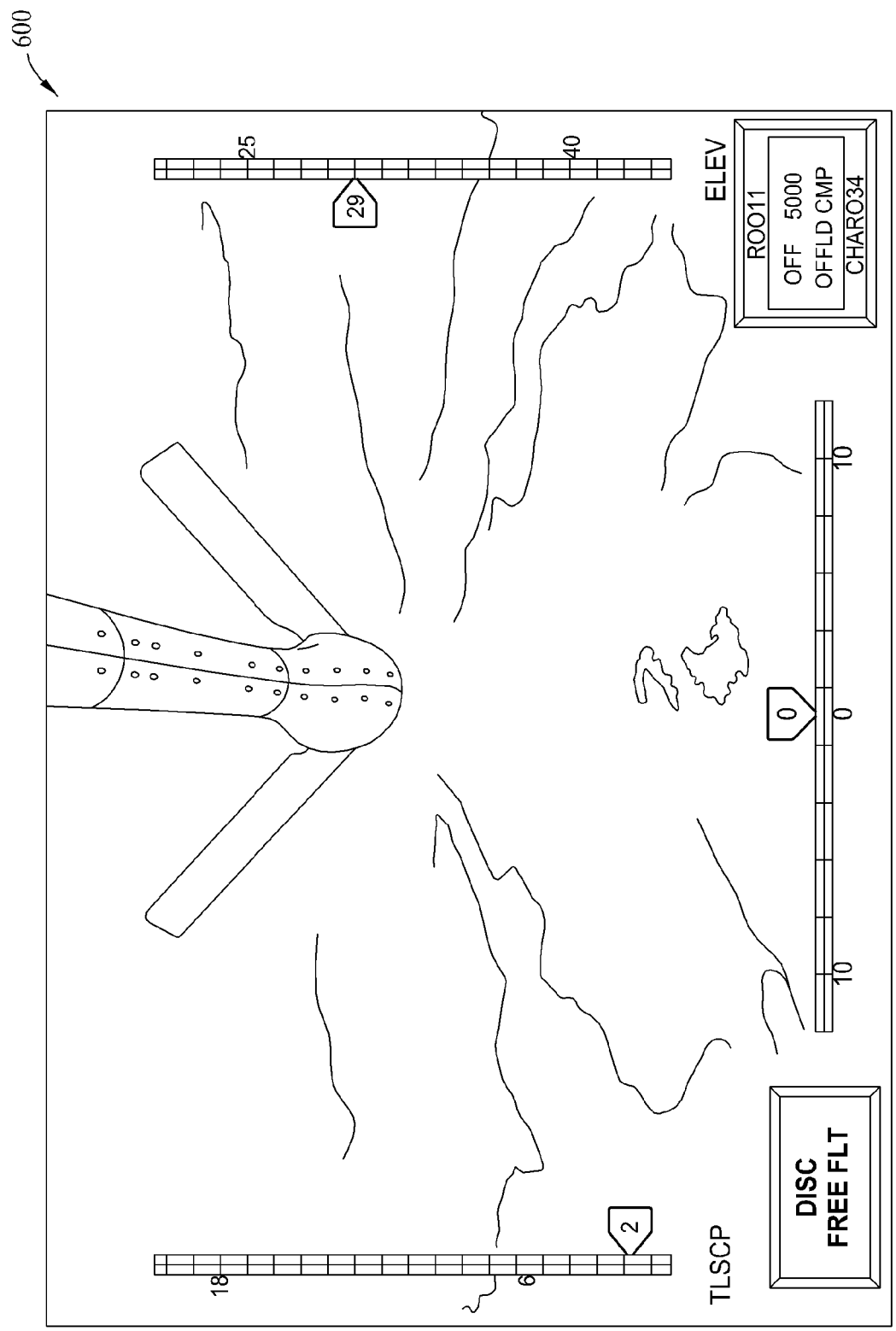
FIG. 6 is an example operator display provided when aerial refueling system is in an "off" mode.
Figure 7:
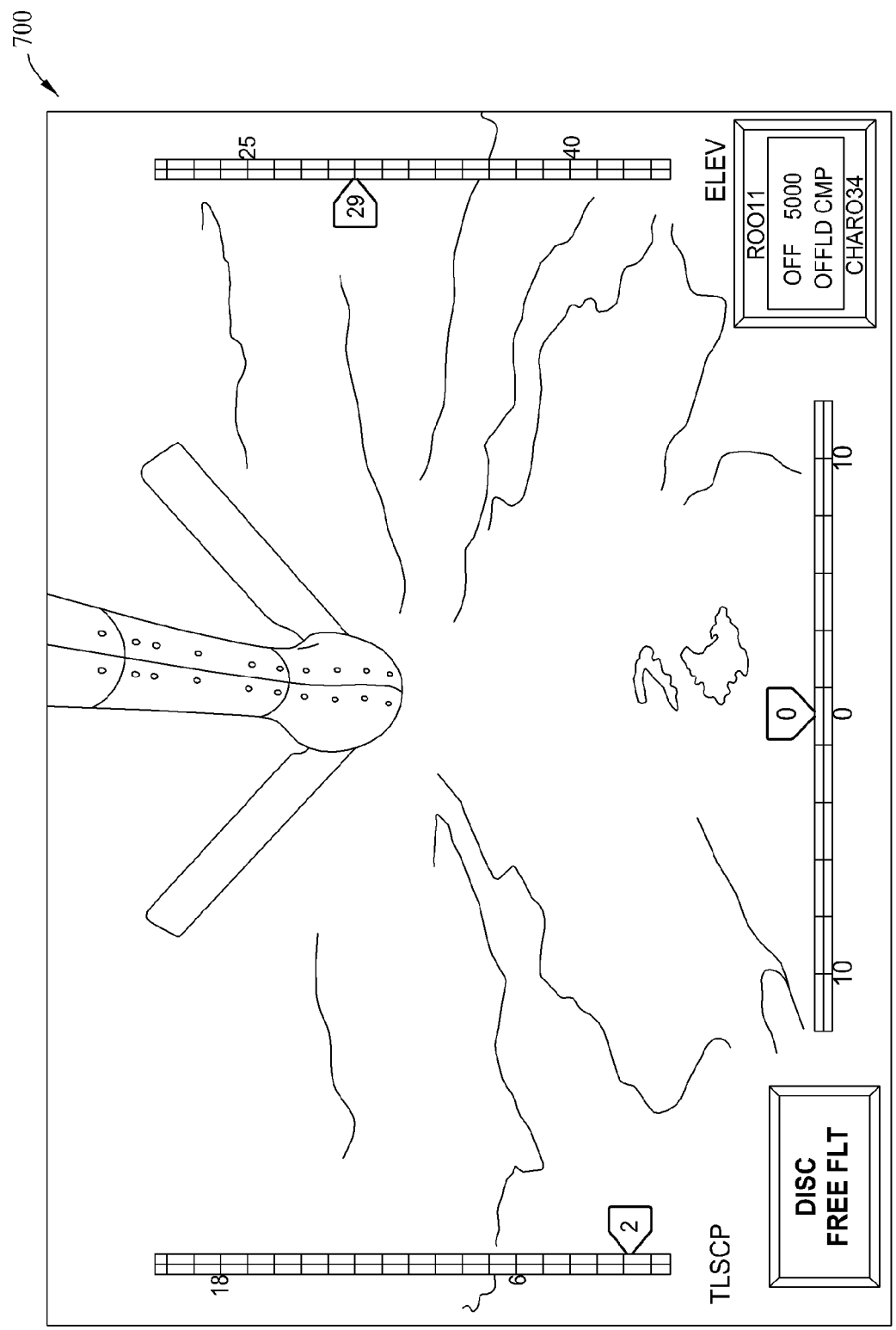
FIG. 7 is an example operator display illustrating the aerial refueling system in an operating mode where no receiving aircraft have been detected.

FIG. 6 is an example operator display 600 when aerial refueling system 400 is in an "off" mode. Display 600 is an example display when aerial refueling system 400 is operating in mode 1 as described above. Similarly, FIG. 7 is an example operator display 700 illustrating aerial refueling system 400 is operating in mode 2 as described above, no receiving aircraft having been detected.

Figure 8:
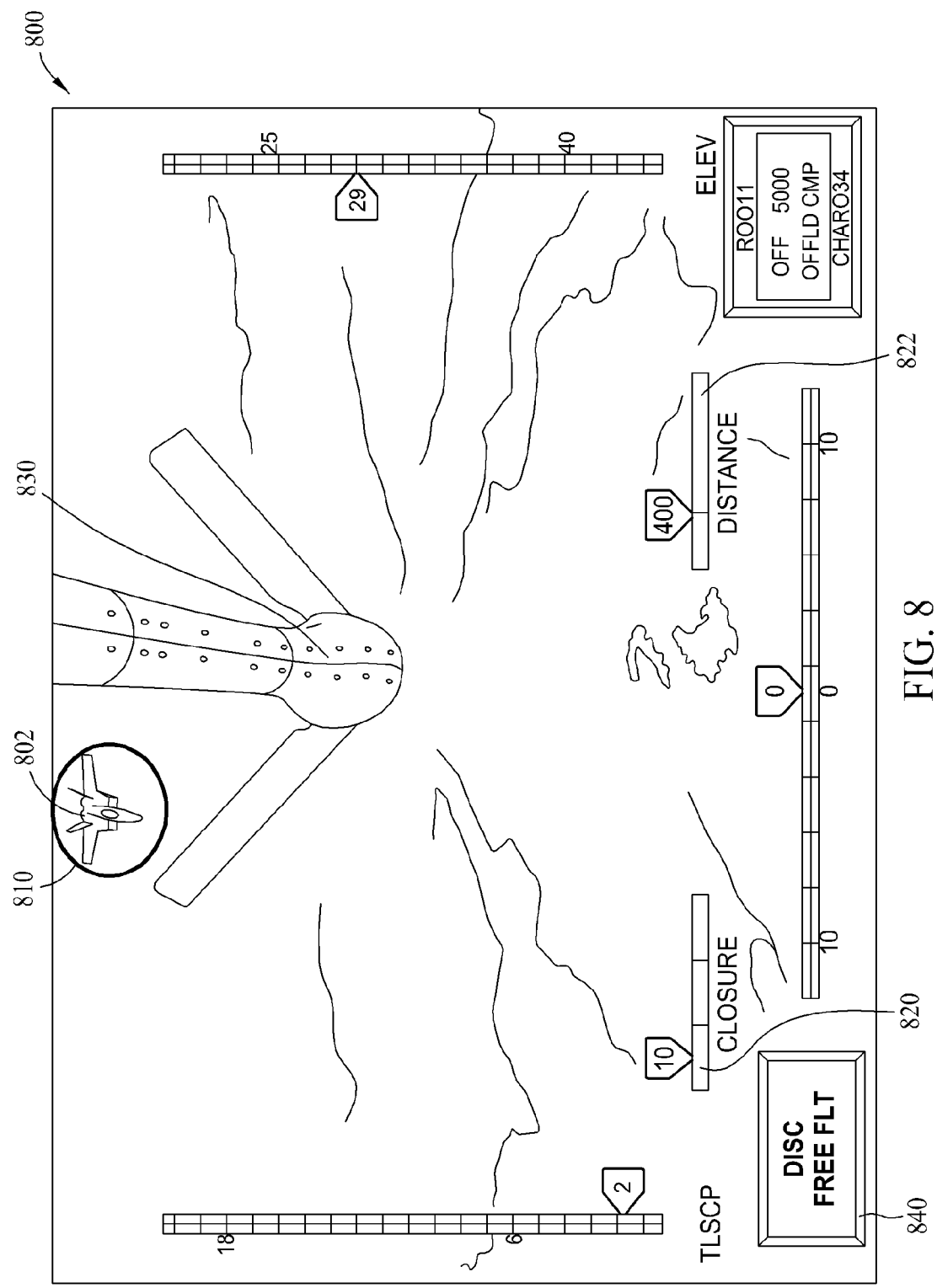
FIG. 8 is an example operator display provided when aerial refueling system has detected, but not identified, a target receiving aircraft.

FIG. 8 is an example operator display 800 when aerial refueling system 400 has detected a target receiving aircraft 802, described above as mode 3. With a long range detection, the aircraft 802 cannot be identified by aerial refueling system 400. However, a circular detection overlay 810 indicates a position of the target receiving aircraft on display 408 for the benefit of the boom operator. In alternative embodiments, aircraft detection beyond visual range is enabled with the inclusion of an auxiliary system such as an infrared or a millimeter wave radar synthetic vision search and track system. Indicators 820 and 822 respectively indicate a closure rate and a distance between the nozzle 830 of the boom 432 and the detected aircraft 802.

Figure 9:
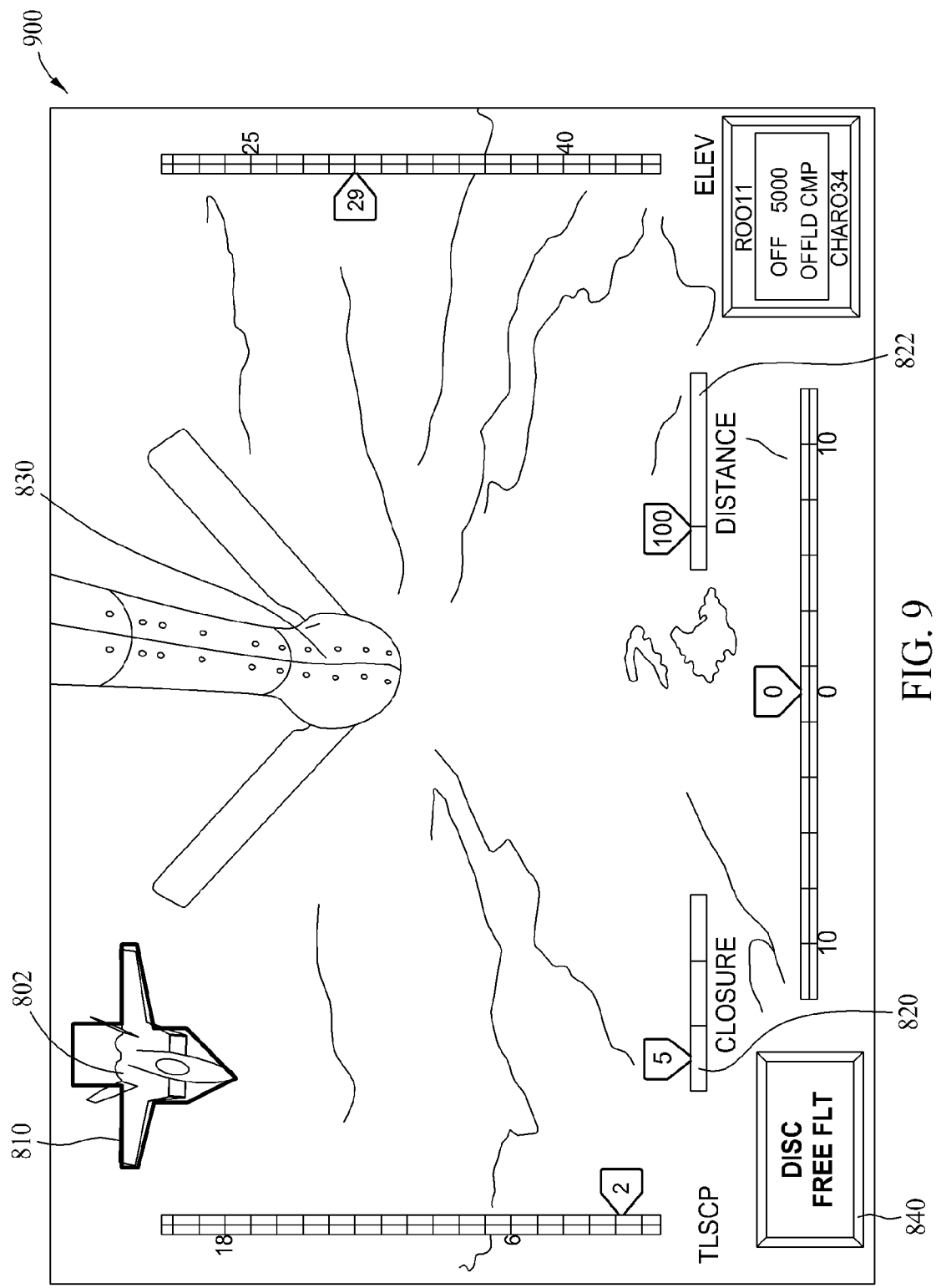
FIG. 9 is an example operator display provided when aerial refueling system has identified the type of the detected target receiving aircraft.

FIG. 9 is an example operator display 900 when aerial refueling system 400 has identified the type of the detected target receiving aircraft 802, described above as mode 4. In the illustrated embodiment, identification is indicated by the target receiving aircraft 802 being encircled by an overlay 902. For clarity, overlay 902 may be referred to herein as an identification overlay 902. As with display 800, indicators 820 and 822 respectively indicate a closure rate and a distance between the nozzle 830 of the boom 432 and the now identified target receiving aircraft 802.

Figure 10:
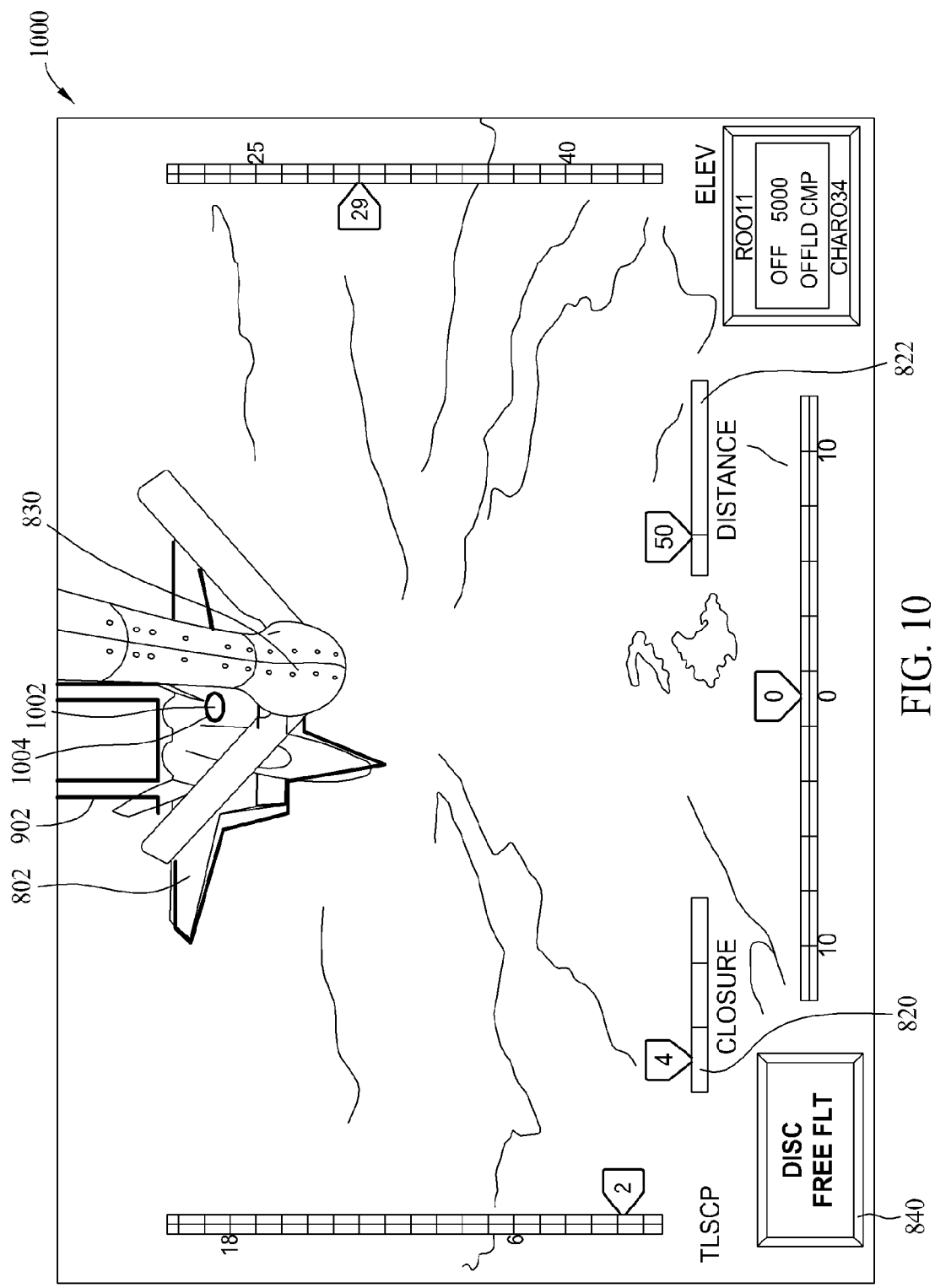
FIG. 10 is an example operator display provided when aerial refueling system has recognized the location of the fuel receiving receptacle associated with the target receiving aircraft.

FIG. 10 is an example operator display 1000 when aerial refueling system 400 has recognized the location of the refueling receptacle 1002 associated with the target receiving aircraft 802. The aircraft 802 is not yet within the refueling area (sometimes referred to as a boom contact area). Specifically, an refueling receptacle overlay 1004 is indicated on display which the boom operator can view. Refueling receptacle overlay 1004 and identification overlay 902 are overlaid on the boom operator's display to provide guidance in deploying the boom 432. In various embodiments, recognition of the receiver aircraft refueling receptacle 1002, or aerial fueling receptacle, is accomplished utilizing pre-existing knowledge of receiver aircraft type, and therefore pre-existing knowledge of receptacle location on the particular aircraft type as stored in library 406. Alternatively, model based pattern matching within vision processing system 404 is utilized to complete acquisition of the receptacle 1002. As with displays 800 and 900, indicators 820 and 822 respectively indicate a closure rate and a distance between the nozzle 830 of the boom 432 and the target receiving aircraft 802. In one embodiment, identification overlay 902 becomes more detailed as the aircraft 802 gets closer to the refueling area, as depicted in FIG. 10.

Figure 11:
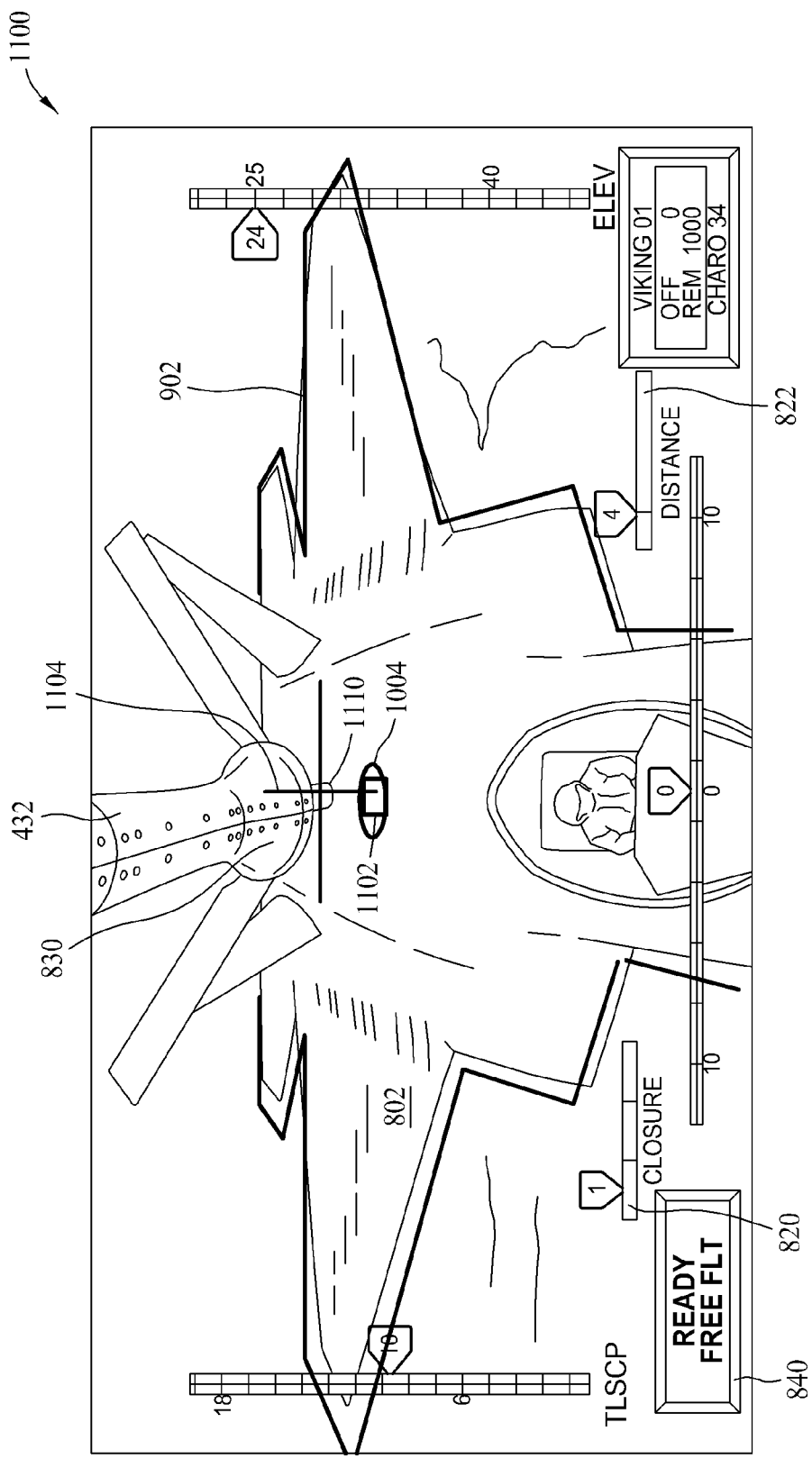
FIG. 11 is an example operator display provided when aerial refueling system has recognized that the target receiving aircraft is within the refueling area.

FIG. 11 is an example operator display 1100 when aerial refueling system 400 has recognized that the target receiving aircraft 802 is within the refueling area. In addition to refueling receptacle overlay 1004, display 1100 includes a receptacle overlay 1102 highlighting the refueling receptacle on the receiver aircraft image once acquisition is achieved by the system 400. Display 1100 further includes a reticule overlay 1104 which indicates a projected "impact point" where the aircraft engaging member 1110 of nozzle of boom 432 would contact the receiver aircraft 802 if the boom 432 was extended in the current boom position. In one embodiment, both an inertial solution of tanker aircraft and an anticipated flight path of the boom 432 (if in motion) are integrated into the impact point determination. The reticule overlay 1104 is presented to the boom operator via display 408 as calculated by vision processing system 404. Indicators 820 and 822 respectively indicate a closure rate and a distance between the nozzle 830 of the boom 432 and the target receiving aircraft 802.

Figure 12:
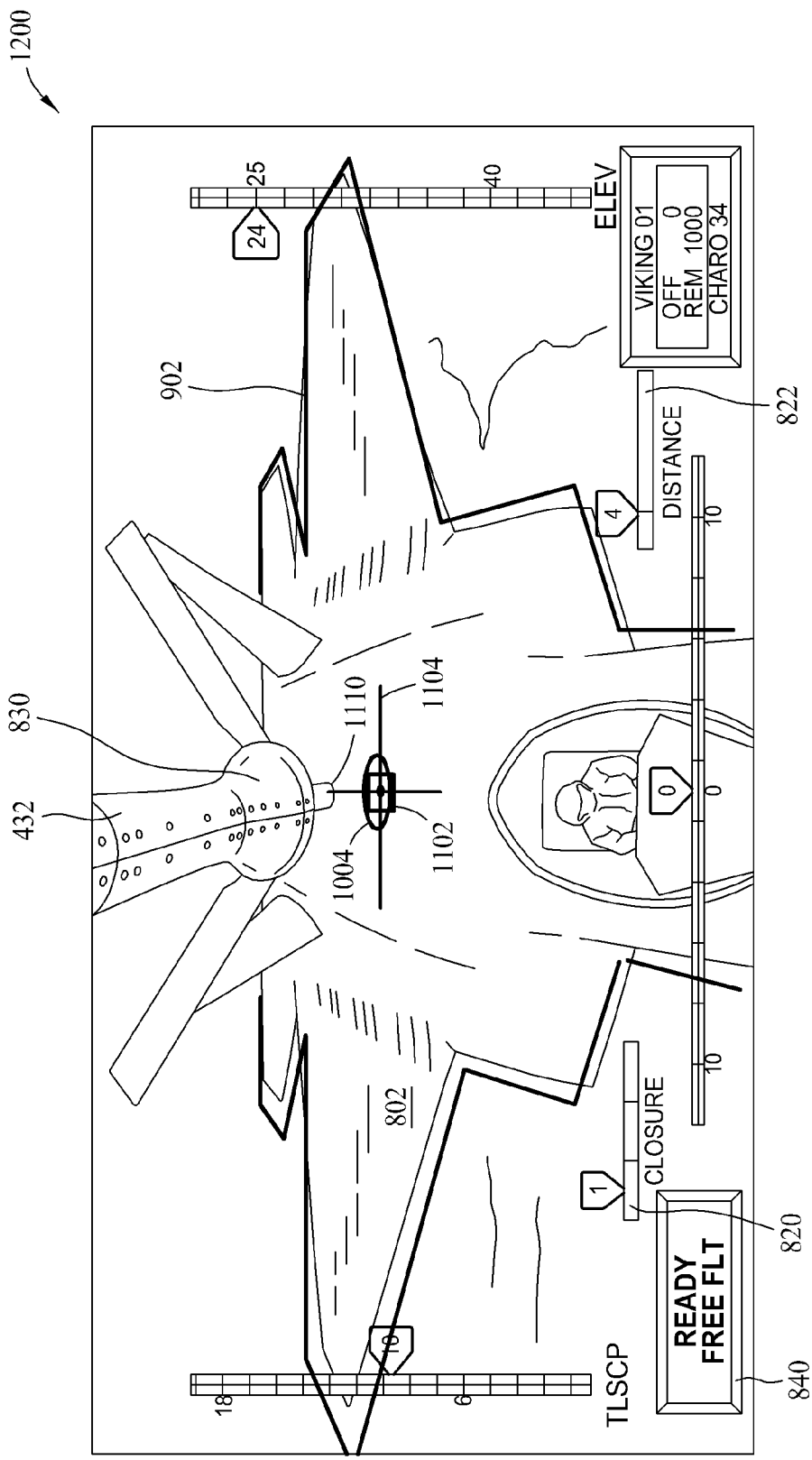
FIG. 12 is an example operator display provided when the boom operator has successfully aligned the nozzle of the boom with the receptacle of the receiving aircraft.

In short, the reticule overlay 1104 is used by the boom operator to fly the boom 432 such that the operator causes an intersection of the reticule overlay 1104 to be inside the rectangle (as shown in the figure) of receptacle overlay 1102 as shown in the operator display 1200 of FIG. 12. When the boom operator successfully places the intersection (e.g., crosshairs) of reticule overlay 1104 within receptacle overlay 1102, both reticule overlay 1104 and receptacle overlay 1102 change color, as also shown in FIG. 12, indicating that the boom 432 is aligned with the refueling receptacle.

Figure 13:
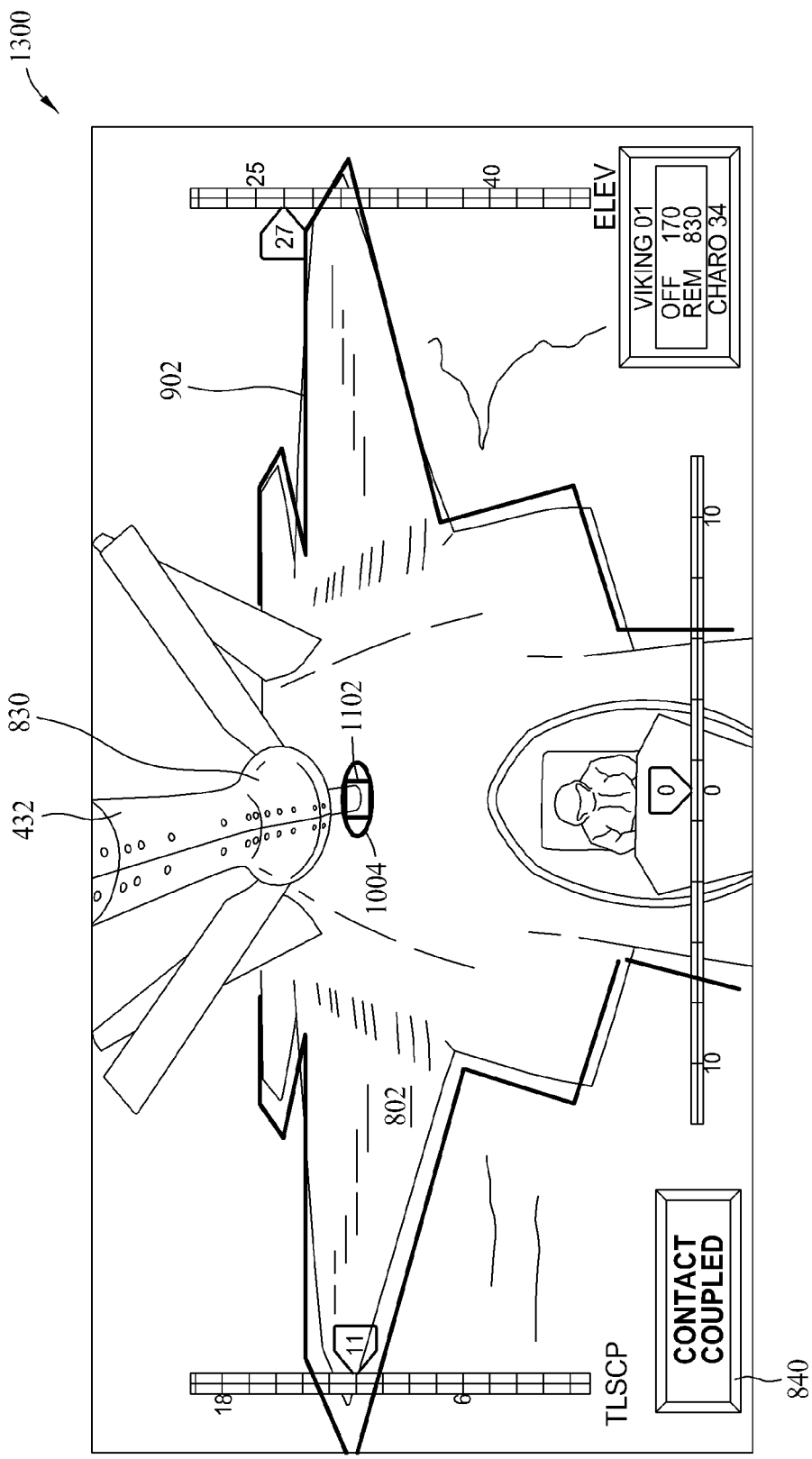
FIG. 13 is an example operator display provided when the boom has engaged the refueling receptacle of the target receiving aircraft.

FIG. 13 is an example operator display 1300 shown on display 408 when the boom 432 has engaged the refueling receptacle of the target receiving aircraft. Information box 840 has changed from "Ready Free Flight" to "Contact Coupled". In addition, the closure rate and distance indicators 820 and 822 are no longer included in the display. Reticle overlay 1104 (shown in FIGS. 11 and 12 is removed from the display 408 when the boom 432 and the receiving aircraft are engaged.

As easily discerned from the above described figures, relative closure rate information is provided to the boom operator, via graphic display (indicator 820), indicating how quickly the receiver aircraft 802 is closing on the tanker aircraft as the receiver aircraft 802 moves into "pre-contact" position, and then "contact" position. Distance information is also provided to the boom operator, via graphic display (indicator 822), with both numerical distance as well as a graphical representation that indicates the distance from the planned contact point.

Figure 14:
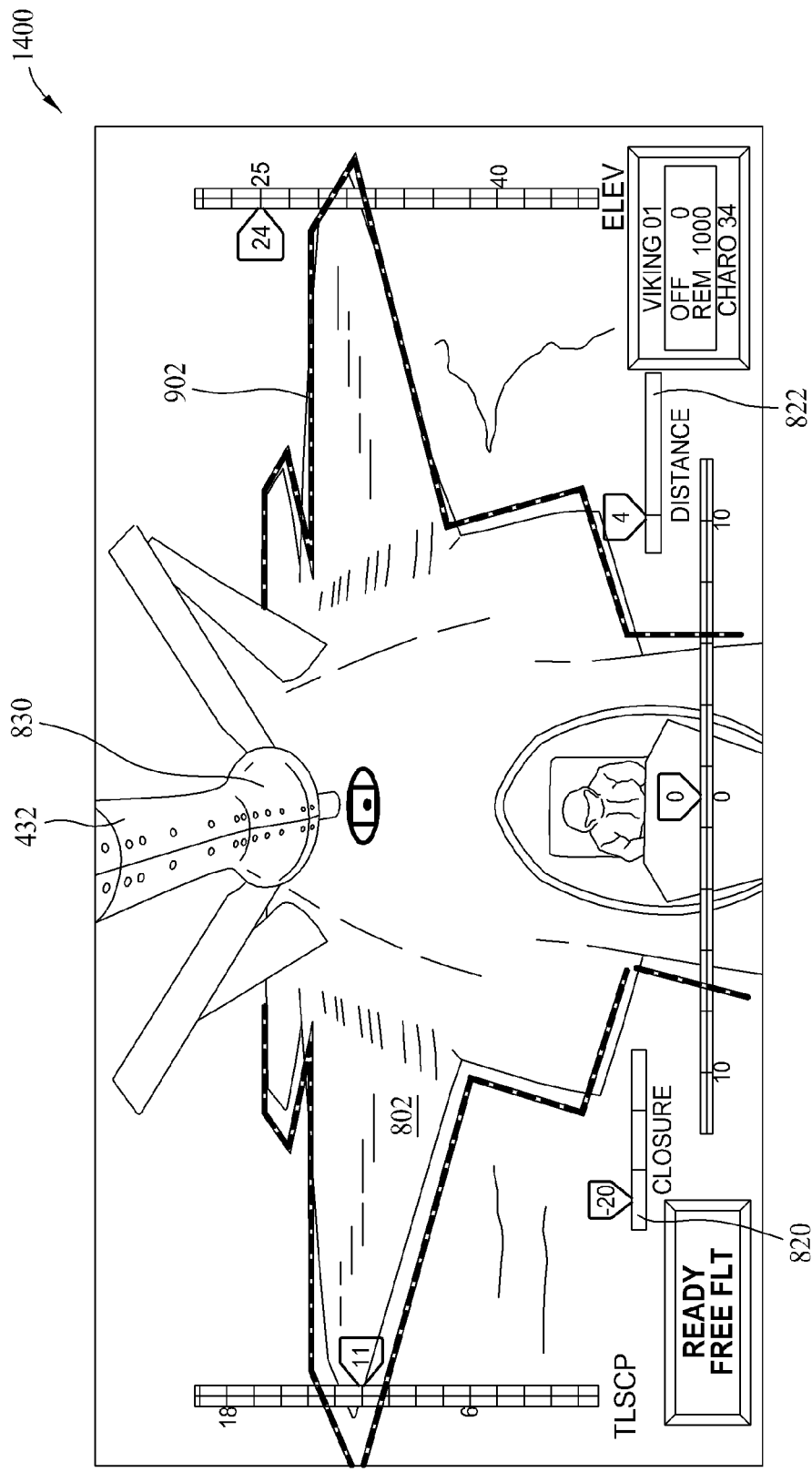
FIG. 14 is an example operator display provided during a breakaway mode.

When a closure rate exceeds prescribed rates, or when the distance between boom 432 and receiving aircraft is less than a prescribed value, a breakaway mode may be initiated. FIG. 14 is an example operator display 1400 shown on display 408 during a breakaway mode. Specifically, the overlay outline 1402 around the receiving aircraft is changed in color, for example, changing from green (in normal operating modes) to red. The changing color of overlay outline 1402 provides breakaway mode confirmation to the boom operator. Closure rate and distance indicators 820 and 822 are activated to provide separation situational awareness. In one embodiment, aerial refueling system 400 must be reset to exit breakaway mode and return to normal mode.

As understood from the figures and the above description, aerial refueling system 400 provides flight director-type guidance cues on display 408 that help the boom operator to fly the impact point (nozzle) of the boom 432 to the defined receptacle location of an identified aircraft. These cues are generated using flight control algorithms that determine relative position and velocities of the boom relative to the refueling receptacle of a target aircraft. The depictions in the above described figures may be embodied in other formats.

The described embodiments also provide a growth path from "guided" boom/receiver engagement to "coupled autopilot" boom/receiver engagement. Similar to a pilot using a Flight Director in an instrument approach to hand fly the aircraft or couple the autopilot and let the aircraft fly the approach automatically, the described embodiments lead to automated boom/receiver engagements and ultimately to fully automated aerial refueling of Unmanned Air Vehicles (UAV's).

Summarizing, based on images received from camera 402, the vision processing system 404 automatically spots an approaching receiver aircraft behind the tanker aircraft. Still utilizing data received from camera 402, vision processing system 404 continues to track the receiver aircraft while automatically determining aircraft type, rate of closure and distance which are provided to the boom operator via display 408. While the receiver aircraft is being tracked, system 400, automatically schedules the fuel offload parameters (e.g., the number of aerial refueling pumps to use and desired pump flow rate) to command. As the receiving aircraft flies up to the "pre contact" position, the camera 402 and vision processing system 404 track it, as well as monitoring the safe ingress of the receiving aircraft. As shown by FIG. 14, rapid or unstable approaches are noticed and appropriate messages, warnings, and actions are triggered. In embodiments, pattern matching is utilized to determine distance from tanker to receiving aircraft and changes of target size to determine relative velocity between receiving aircraft and tanker.

Figure 15:
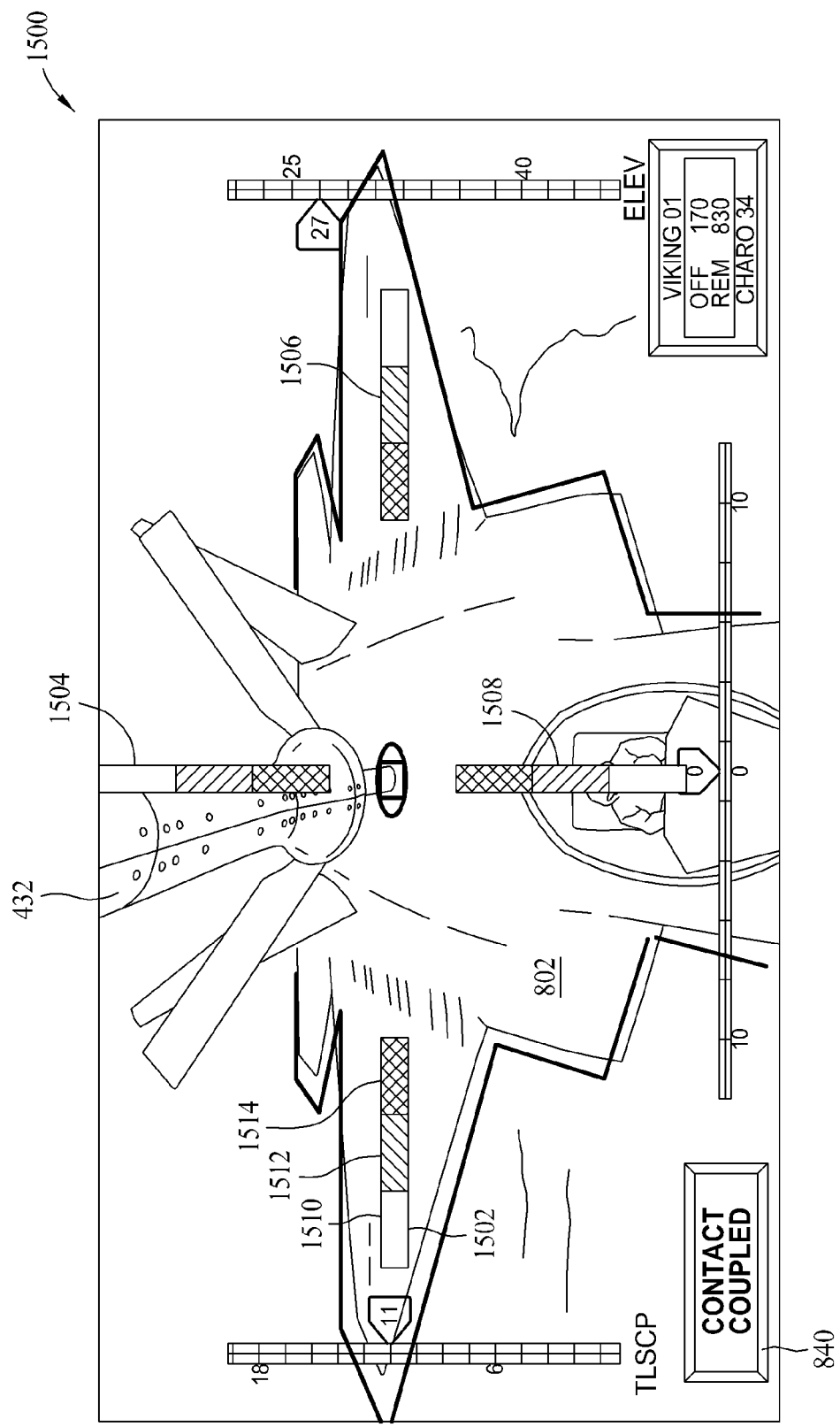
FIG. 15 is an example operator display provided during contact between the boom and the receiving aircraft, indicative of stresses experienced by the boom during the refueling operation.

FIG. 15 is an example operator display 1500 provided during contact between the boom and the receiving aircraft, indicative of stresses experienced by the boom during the refueling operation. Display 1500 includes a set of outer cross hairs 1502, 1504, 1506, and 1508 which are indicative of an alignment of the boom 432 with respect to the receiving aircraft 802. Boom 432, as is known, is equipped with a number of strain sensors at the nozzle 830, and along its length, providing signals indicative of stresses experienced by the boom 432 when, during refueling contact, a misalignment between the boom 432 and the receptacle 1002 of receiving aircraft 802 occur.

In one embodiment, outer cross hairs 1502, 1504, 1506, and 1508 are a notional method of providing steering cue information to the aerial refueling operator who is able to move the boom, at least to a certain extent, to relieve such stresses. The outer cross hairs 1502, 1504, 1506, and 1508 provide an indication of stresses being experienced by the boom 432 during refueling. In the example embodiment, each outer cross hair includes a number of subsections, 1510, 1512, and 1514, respectively indicating good alignment between boom 432 and aircraft 802, a moderate amount of boom stresses due to an amount of misalignment, and an unacceptable amount of boom stress due to gross misalignment between boom 432 and receiving aircraft 802. As is easily understood by the quadrant configuration of outer cross hairs 1502, 1504, 1506, and 1508, when a misalignment between boom 432 and receiving aircraft 802 is sensed in a particular direction, the outer cross hair associated with that quadrant provides an updated indication. In one embodiment, colors associated with outer cross hairs 1502, 1504, 1506, and 1508 include respectively, green, yellow and red.

In one embodiment, outer cross hairs 1502, 1504, 1506, and 1508 are presented, via display 408, to the aerial refueling operator upon degradation of the automatic load alleviation system (ALAS), thereby illustrating when the boom 432 is experiencing stress in either azimuth or elevation. The aerial refueling operator attempts to "fly" the boom 432 so as to maintain a green indication on all four outer cross hairs. It is understood that there are a number of ways to present alignment data and the outer cross hair/coloration approach is but one. Such methodology is also useful to prevent unintended boom movement during an unplanned disconnect between the boom 432 and receiving aircraft 802.

As described above, using the described embodiments, refueling boom guidance is accomplished via some visual cues (e.g. a "box" in the center of the viewing image that corresponds to the correct alignment for refueling receptacle contact) and manual inputs from the Boom Operator. Much of the current accuracy lies in the expertise of the boom operator rather than in the aerial refueling system as now proposed with inclusion of the described embodiments where a lot of the responsibility of the boom operator is offloaded onto the operational system, relieving operator stress and fatigue.

Aerial refueling system 400, and the operator display associated therewith provide a system and a method to enhance the situational awareness of refueling operations. In the described embodiments, early detection (beyond visual range) is provided. Longer than visual ranges may be achieved by incorporating an infrared and/or Millimeter Wave Radar (MMWR) synthetic vision search and track capability to system 400. The early detection is provided by a non-emitting source, including but not limited to an infrared system.

Referring specifically to displays associated with system 400, receiving aircraft location is determined and highlighted, for example, by an overlay displayed on display 408. Once receiving aircraft location is determined, a distance between the boom and receiving aircraft is determined and displayed to the boom operator at display 408. In addition, a closing rate of the receiving aircraft is determined and subsequently displayed at display 408. Further, an aircraft type is associated with the receiving aircraft, allowing for an indication of receiving receptacle placement to be determined and displayed at display 408. In one embodiment, pattern recognition software and the received image of the receiving aircraft is utilized to determine receiving aircraft type.

Aerial refueling system 400 further provides for the enhanced guidance and control of the refueling boom as it maneuvers into correct alignment. The flight director-type guidance cues provided by the overlays and indicators help the boom operator to fly the boom impact point (nozzle) to the defined receptacle location of the receiving aircraft. These overlays and indicators and their contents are generated, for example, from flight control algorithms that determine relative positions and velocities of the boom relative to the receptacle of the receiving aircraft.

Tanker pilot situational awareness of the refueling operation is enhanced in certain embodiments by including a repeater display, for example, a display mode on a cockpit multi-function display or other display device that displays the identical information that is displayed on display 408, which is viewed by the boom operator.

Inclusion of visual aiding technology including, but not limited to, infrared cameras for night refueling, red-eye elimination, glare and glint, filtering for sunlight-prone daylight refueling, enhanced lighting technologies, and the inclusion of a new camera system that extends the aft viewing angle to 190 degrees or more to enhance situational awareness during refueling operations is contemplated within the described embodiments.

Through the identification of receiving aircraft, embodiments that include logging and receipt of fuel transactions so the correct charges can be made for fuel that is offloaded to non-owner aircraft. Also through identification of receiving aircraft, a procedure that automatically chooses the number of fuel pumps to utilize as well as a pump flow rate is implemented.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for aerial refueling situational awareness, said method comprising:
   providing, to a display, a video image of an aircraft in a refueling environment;
   automatically identifying, by a processor, a type of aircraft when an aircraft to be refueled enters the refueling environment;
   providing at least one video overlay over the video image of the aircraft based on the identification of the type of aircraft, the at least one video overlay indicative of a positional relationship between the aircraft to be refueled and a tanker aircraft, the at least one video overlay including at least one guidance cue configured to assist in aligning an aerial refueling boom coupled to the tanker aircraft with respect to a receptacle coupled to the aircraft to be refueled such that the aerial refueling boom is coupleable to the receptacle, wherein the at least one guidance cue comprises a first receptacle video overlay indicating a position of the refueling receptacle on the at least one video overlay based on the identification of the aircraft, and wherein the at least one guidance cue comprises a second receptacle video overlay indicating a position of the refueling receptacle on the video image of the aircraft; and
   determining, by the processor, at least one of a number of fuel pumps and a fuel flow rate to be used by the aerial refueling boom based at least in part on the type of aircraft to be refueled.

2. The method according to claim 1 wherein providing a video overlay comprises:
   detecting a position of the aircraft to be refueled; and
   providing a detection video overlay on the display indicating a relative position of the aircraft to be refueled with respect to the refueling environment.

3. The method according to claim 2 wherein providing a video overlay further comprises:
   removing the detection video overlay upon identifying the type of aircraft to be refueled; and
   providing an identification video overlay on the display indicating the type of aircraft and a relative position of the aircraft with respect to the refueling environment.

4. The method according to claim 1 wherein providing a video overlay comprises:
   detecting that the position of the aircraft to be refueled is within a defined refueling area;
   providing a reticule overlay on the display indicating an impact point of the refueling boom; and
   adjusting a position of the reticule overlay based on boom operator maneuvering of the boom.

5. The method according to claim 4 further comprising changing a color of at least one of the first and second receptacle overlay and the reticule overlay when the boom operator maneuvers an intersection of the reticule overlay to be within the first and second receptacle overlays, indicating the boom is aligned with the refueling receptacle.

6. The method according to claim 1 further comprising:
   monitoring at least one of a closure rate and a distance between the aircraft to be refueled and the tanker aircraft; and
   changing at least one feature of the at least one video overlay indicative of the positional relationship when at least one of the closure rate exceeds a predefined rate and the distance between the aircraft to be refueled and the boom of the tanker aircraft becomes less than a predefined distance.

7. The method according to claim 1 further comprising providing at least one indicator for viewing on the display by the refueling boom operator, the indicator illustrating an amount of mechanical stress in a physical engagement between the boom and the aircraft to be refueled as providing by at least one strain sensor attached to the boom.

8. The method according to claim 7 wherein providing at least one indicator comprises providing indicators indicating the amount of mechanical stress in both azimuth and elevation.

9. An aerial refueling situational awareness system comprising:

a camera operable to provide a video image of an aircraft in a refueling area, the refueling area including a distal end of a refueling boom therein;

a vision processing system communicatively coupled to said camera; and an operator display communicatively coupled to said vision processing system, said operator display configured to present images of the refueling environment to a boom operator, said vision processing system programmed to:

automatically identify a type of aircraft when an aircraft to be refueled enters the refueling environment;

generate at least one video overlay over the video image of the aircraft provided by the camera such that the at least one video overlay at least substantially surrounds the video image of the aircraft, wherein the at least one video overlay is based on the identification of the type of aircraft, the at least one video overlay configured to provide situational awareness to the boom operator viewing the refueling area on said operator display and indicate a relationship between the aircraft to be refueled and a tanker aircraft, the at least one video overlay including at least one guidance cue configured to assist in aligning an aerial refueling boom coupled to the tanker aircraft with respect to a receptacle coupled to the aircraft to be refueled such that the aerial refueling boom is coupleable to the receptacle, wherein the at least one video overlay is based on a position of the refueling boom as sensed by the camera and relayed to the vision processing system; and determine at least one of a number of fuel pumps and a fuel flow rate to be used by the aerial refueling boom based at least in part on the type of aircraft to be refueled.

10. The aerial refueling system of claim 9, said vision processing system programmed to:

recognize that an aircraft is approaching the refueling area based on image data received from said camera; and cause a detection overlay to be displayed on said operator display indicating that an aircraft is approaching the refueling area, wherein the detection overlay is displayed prior to the aircraft entering the refueling area.

11. The aerial refueling system of claim 9 further comprising a library of aircraft image data, said vision processing system programmed to:

identify an aircraft approaching the refueling area based on a comparison of the image data of the aircraft received from said camera and stored aircraft image data within said library; and cause an identification overlay to be displayed on said operator display indicating identification of the approaching aircraft, wherein the identification overlay is displayed subsequent to the aircraft entering the refueling area.

12. The aerial refueling system of claim 11 wherein the video overlay comprises an outline of the approaching, identified aircraft, said vision processing system is programmed to adjust a size and a detail associated with said overlay as the aircraft gets closer to the refueling area.

13. The aerial refueling system of claim 11 wherein, said vision processing system is programmed to cause a first receptacle overlay to be displayed by said operator display, said first receptacle overlay indicative of a position of the refueling receptacle on the video overlay based on the identification of the approaching aircraft.

14. The aerial refueling system of claim 11, said vision processing system programmed to:

recognize that an aircraft is within the refueling area based on image data received from said camera;

cause a second receptacle overlay to be displayed on said operator display highlighting a position of the refueling receptacle on the video image of the aircraft to be refueled; and cause a reticule overlay to be displayed on said operator display indicating an impact point of the refueling boom; and adjust a position of said reticule overlay based on boom operator maneuvering of the boom acquired by said camera.

15. The aerial refueling system of claim 14 wherein said vision processing system is programmed to change a color of the second receptacle overlay and the reticule overlay displayed on said operator system when the boom operator maneuvers an intersection of the reticule overlay to be within the second receptacle overlay, indicating the boom is aligned with the refueling receptacle.

16. The aerial refueling system of claim 9 wherein said vision processing system is programmed to:

monitor at least one of a closure rate and a distance between the aircraft to be refueled and the aircraft configured with said system based on image data received from said camera; and cause at least one feature of the at least one video overlay displayed on said operator display to be changed when at least one of the closure rate exceeds a predefined rate and the distance between the aircraft to be refueled and the boom of the aircraft becomes less than a predefined distance.

17. The aerial refueling system of claim 9 wherein said vision processing system is programmed to generate at least one indicator onto the video image, the at least one indicator configured to provide situational awareness to a boom operator viewing said operator display regarding an amount of mechanical stress in a physical engagement between the boom and the aircraft to be refueled, said aerial refueling system configured to receive signals from at least one strain sensors mounted on the boom.

18. The aerial refueling system of claim 17 wherein the at least one indicator comprises indicators indicating the amount of mechanical stress in both azimuth and elevation.

19. The aerial refueling system of claim 9 wherein said vision processing system is programmed to:

determine a type for a detected receiver aircraft;

provide a refueling receptacle location for display on said operator display based on the determined type.

20. The aerial refueling system of claim 19, said system configured to receive tanker aircraft inertial reference data and data from said camera to generate a display on said operator display including guidance cueing symbols for use by an operator to in moving a refueling boom to and into a refueling receptacle of a receiver aircraft.

21. The method according to claim 1 wherein providing a video overlay comprises:

providing a first receptacle overlay based on the identification of the aircraft by the processor, wherein the first receptacle overlay is provided prior to the aircraft entering a refueling area;

providing a second receptacle overlay over the video image of the aircraft, wherein the second receptacle overlay is provided after the aircraft enters a refueling area.

* * * * *